United States Patent
Tuan et al.

(10) Patent No.: US 11,641,323 B1
(45) Date of Patent: May 2, 2023

(54) PROGRAMMABLE CONGESTION CONTROL ENGINE

(71) Applicant: XILINX, INC., San Jose, CA (US)

(72) Inventors: Nguyen Duy Anh Tuan, Singapore (SG); Ji Yang, San Jose, CA (US); Chengchen Hu, Singapore (SG); Yan Zhang, Singapore (SG); Guanwen Zhong, Singapore (SG); Gordon John Brebner, Monte Sereno, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/037,359

(22) Filed: Sep. 29, 2020

(51) Int. Cl.
  *H04L 47/11* (2022.01)
  *H04L 49/901* (2022.01)
  *H04L 47/12* (2022.01)
  *H04L 41/0803* (2022.01)
  *H04L 41/00* (2022.01)

(52) U.S. Cl.
  CPC .......... *H04L 47/11* (2013.01); *H04L 41/0803* (2013.01); *H04L 41/24* (2013.01); *H04L 47/12* (2013.01); *H04L 49/901* (2013.01)

(58) Field of Classification Search
  None
  See application file for complete search history.

(56) References Cited

U.S. PATENT DOCUMENTS

| | | | | |
|---|---|---|---|---|
| 2003/0202534 | A1* | 10/2003 | Cloonan | H04N 7/22 370/468 |
| 2005/0114540 | A1* | 5/2005 | Hariharan | H04L 47/10 709/232 |
| 2009/0323692 | A1* | 12/2009 | Li | H04L 69/16 370/392 |
| 2018/0198890 | A1* | 7/2018 | Dhanabalan | H04L 69/16 |
| 2018/0302328 | A1* | 10/2018 | Keith | H04L 47/24 |
| 2019/0245915 | A1* | 8/2019 | Kommula | H04L 67/1023 |
| 2021/0152484 | A1* | 5/2021 | Shpigelman | H04L 47/263 |

OTHER PUBLICATIONS

Hilland, J., Culley, P., Pinkerton, J., and Recio, R., "OMA Protocol Verbs Specification (Version 1.0)" Apr. 2003, <http://www.rdmaconsortium.org/home/draft-hilland-iwarp-verbs-v1.0-RDMAC.PDF>.

(Continued)

*Primary Examiner* — Andre Tacdiran
(74) *Attorney, Agent, or Firm* — Patterson + Sheridan, LLP

(57) ABSTRACT

Examples herein describe an acceleration framework that includes a hybrid congestion control (CC) engine where some components are implemented in software (e.g., a CC algorithm) while other components are implemented in hardware (e.g., measurement and enforcement modules and a flexible processing unit). The hardware components can be designed to provide measurements that can be used by multiple different types of CC algorithms. Depending on which CC algorithms are currently enabled, the hardware components can be programmed to perform measurement, processing, and enforcement tasks, thereby freeing the CPUs in the host to perform other tasks. In this manner, the hybrid CC engine can have the flexibility of a pure software CC algorithm with the advantage of performing many of the operations associated with the CC algorithm in hardware.

18 Claims, 8 Drawing Sheets

(56) References Cited

OTHER PUBLICATIONS

Akshay Narayan, Frank Cangialosi, Deepti Raghavan, et.al. 2018. "Restructuring endpoint congestion control". In Proceedings of the 2018 Conference of the ACM Special Interest Group on Data Communication (SIGCOMM '18). ACM, New York, NY, USA, 30-43.

MT Arashloo, A Lavrov, M Ghobadi, J Rexford, "Enabling Programmable Transport Protocols in High-Speed NICs". Dec. 22, 2018. <http://www.cs.princeton.edu/-jrex/papers/tonic.pdf>.

\* cited by examiner

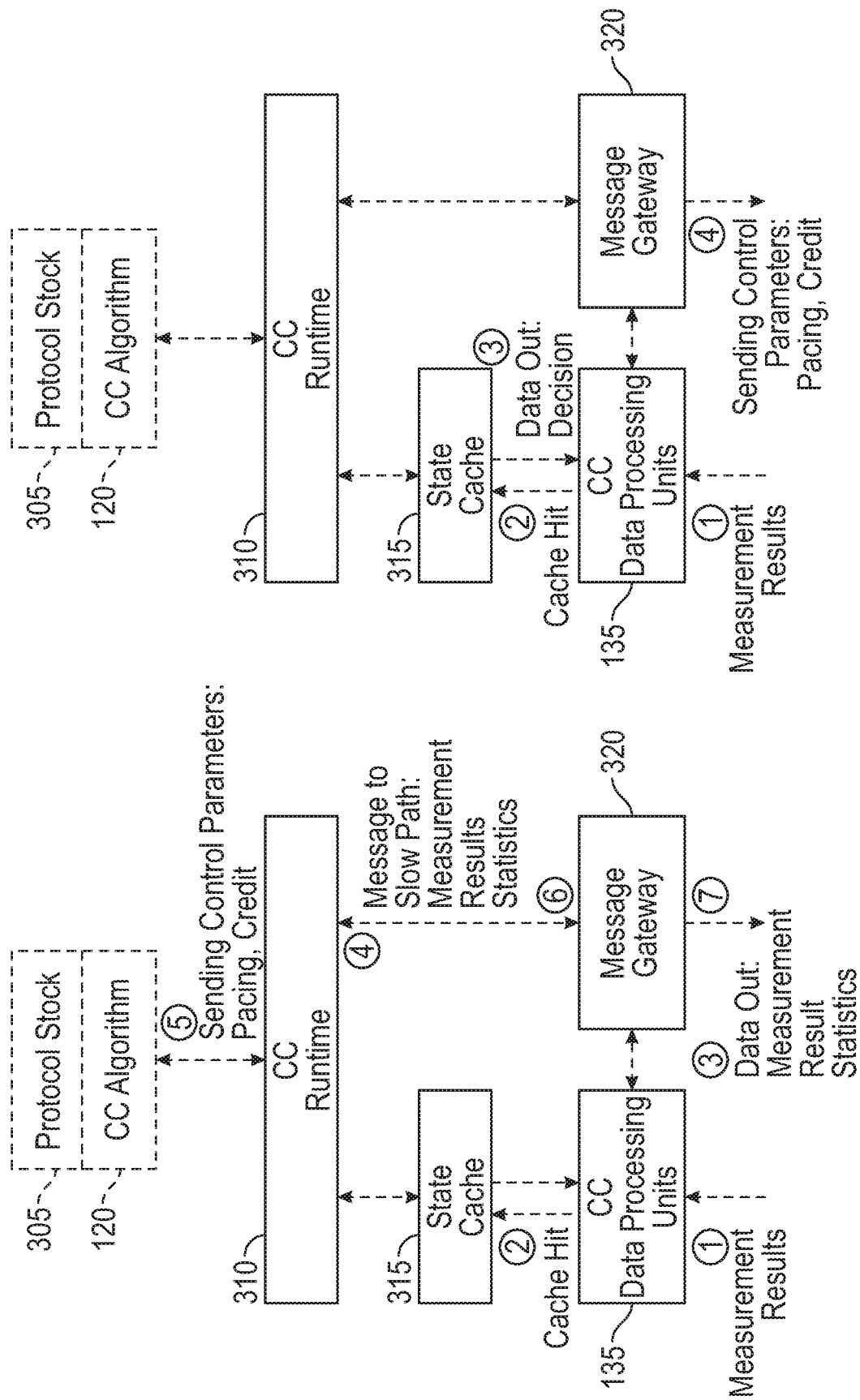

600 ⇘

| PARAMETER | DEFINITION | POSSIBLE IMPLEMENTATION(S) |
|---|---|---|
| ACK_TIMESTAMP | TIMESTAMP OF AN ACK PACKET | A TIMESTAMP TIMER IS MAINTAINED BY THE MEASUREMENT MODULE AND SYNCHRONIZED WITH THE HOST CLOCK. |
| ACK_COUNT | NUMBER OF ACK SEGMENT RECEIVED | COUNT THE NUMBER OF ACK PACKETS. THE COUNTER IS CLEARED BY THE SOFTWARE OR SELF-CLEARED WHEN A TIMER IS UP. |
| ACK_EWMA | EXPONENTIALLY-WEIGHTED MOVING AVERAGE OF THE INTERARRIVAL TIME BETWEEN ACKS | THE PREVIOUS TIME STAMP AND EWMA FOR ACK PACKETS ARE STORED AS STATE VARIABLES. THEY ARE USED TO CALCULATE THE CURRENT EWMA. |
| SEND_EWMA | THE EWMA OF THE TIMESTAMPS INSIDE THE SENT PACKET | THE PREVIOUS TIME STAMP AND EWMA FOR THE EGRESS PACKETS ARE STORED AS STATE VARIABLES. THEY ARE USED TO CALCULATE THE CURRENT EWMA. |
| BYTE_SENT | NUMBER OF BYTES SENT | EXTRACTED FROM THE EGRESS PACKET HEADER. THE COUNTER IS CLEARED BY THE SOFTWARE OR SELF-CLEARED TIMER IS UP. |
| PACKET_SENT | NUMBER OF PACKETS SENT | COUNTER THE NUMBER OF EGRESS PACKETS. THE COUNTER IS CLEARED BY THE SOFTWARE OR SELF-CLEARED WHEN A TIMER IS UP. |
| BYTE_ACKED | NUMBER OF BYTES ACKNOWLEDGED | KEEP THE PREVIOUS BYTE SEGMENT THAT WAS ACKNOWLEDGED BY THE PREVIOUS ACK, OFFSET IT WITH THE CURRENT ACK. THE COUNTER IS CLEARED BY THE SOFTWARE OR SELF-CLEARED WHEN A TIMER IS UP. |
| PACKET_ACKED | NUMBER OF PACKETS ACKNOWLEDGED | IF THE DELAYED ACK IS NOT USED, SIMPLY COUNT THE NUMBER OF ACK PACKETS. IF IT IS USED, EITHER MAINTAIN A LIST OF THE MOST RECENT BYTE SEGMENTS THAT ARE INDICATED BY THE EGRESS PACKETS, COMPARE THEM WITH THE ONE INDICATED IN THE ACK TO DETERMINE THE PACKET_ACKED. OTHERWISE, IT IS |

| | | ALSO POSSIBLE TO DIVIDE THE BYTE_ACKED BY THE CONFIGURABLE MSS (MAXIMUM SEGMENT SIZE) THE COUNTER IS CLEARED BY THE SOFTWARE OR SELF-CLEARED WHEN A TIMER IS UP. |
|---|---|---|
| BYTE_INFLIGHT | NUMBER OF BYTES STILL IN TRANSIT | THE DIFFERENCE BETWEEN THE BYTE_ACKED AND BYTE_SENT. THE COUNTER IS CLEARED BY THE SOFTWARE OR SELF CLEARED WHEN A TIMER IS UP. |
| PACKET_INFLIGHT | NUMBER OF PACKETS STILL IN TRANSIT | THE DIFFERENCE BETWEEN THE PACKET_SENT AND PACKET_ACKED. THE COUNTER IS CLEARED BY THE SOFTWARE OR SELF CLEARED WHEN A TIMER IS UP. |
| SPEED_EGRESS | SENDING SPEED | THE NUMBER OF BYTES SENT WITHIN A CONFIGURABLE INTERVAL. |
| SPEED_INGRESS | RECEIVER SIDE RECEIVING SPEED | THE NUMBER OF BYTES RECEIVER WITHIN A CONFIGURABLE INTERVAL. |
| ECN_BYTES | NUMBER OF BYTES THAT MARKED WITH ECN | PARSE THE ECN FLAG IN THE PACKET HEADER. |
| ECN_PACKETS | NUMBER OF PACKETS THAT MARKED WITH ECN | PARSE THE ECN FLAG IN THE PACKET HEADER. |
| ECN_ECE_INDICATION | INDICATE THAT THE ECE FLAG IS PRESENT | PARSE THE ECN FLAG IN THE PACKET HEADER. |
| RTT | ROUND TRIP DELAY | THE DIFFERENCE BETWEEN THE TIME STAMP OF THE EGRESS PACKET THAT THE CURRENT ACK PACKET ACKNOWLEDGES AND THE ACK_TIME STAMP. |
| SRTT | SMOOTHED RTT | CALCULATED BASED ON THE RFC 2988 OR ANY DERIVATIVE OF IT. |
| RTTVAR | RTT VARIATION | CALCULATED BASED ON THE RFC 2988 OR ANY DERIVATIVE OF IT. |
| RTTMIN | THE MINIMUM RTT SEEN SO FAR FOR THE CURRENT CONNECTION | THE NEWLY CALCULATED RTT IS COMPARED AGAINST THE LOCALLY MAINTAINED MINIMUM ONE TO UPDATE IF NECESSARY. |
| RTTRATIO | THE RATIO BETWEEN THE MOST RECENT RTT AND RTTMIN | IT IS RTT/RTTMIN. |
| RTTACTIVEPROBE | THE RTT PROBED SEPARATELY FROM THE CURRENT CONNECTION TO ITS REMOTE HOST | SEPARATE PROBE PACKETS ARE SENT ACTIVELY BY THE MODULE TO THE SAME REMOTE HOST OF THE FLOW TO MEASURE THE RTT INDEPENDENTLY. TF CAN BE DONE PER INTERVAL OR PER REQUEST. IT IS CONFIGURABLE |
| BDP | BANDWIDTH-DELAY PRODUCT | IT IS SRTT SPEED_EGRESS. |
| BYTE_LOST | NUMBER OF BYTES LOST BASED ON TIMER OR DUPLICATED ACK OR DSACK | CALCULATED BASED ON THE RFC 2551,2883 OR ANY DERIVATIVE OF THEM. THE COUNTER IS CLEARED BY THE SOFTWARE OR SELF-CLEARED WHEN A TIMER IS UP. |
| PACKET_LOST | NUMBER OF PACKETS LOST BASED ON TIMER OR DUPLICATED ACK OR DSACK | IT IS BYTE_LOST/MSS. THE COUNTER IS CLEARED BY THE SOFTWARE OR SELF-CLEARED WHEN A TIMER IS UP. |
| BYTES_MISORDERED | MIS-ORDERED BYTES BASED ON SACK | CALCULATED BASED ON THE RFC 2018 OR ANY DERIVATIVE OF IT. THE COUNTER IS CLEARED BY THE SOFTWARE OR SELF-CLEARED WHEN A TIMER IS UP. |
| PACKETS_MISORDERED | MIS-ORDERED PACKETS BASED ON SACK | CALCULATED BASED ON THE RFC 2018 OR ANY DERIVATIVE OF IT. THE COUNTER IS CLEARED BY THE SOFTWARE OR SELF-CLEARED WHEN A TIMER IS UP. |

FIG. 6B

PROGRAMMABLE CONGESTION CONTROL ENGINE

TECHNICAL FIELD

Examples of the present disclosure generally relate to a programmable congestion control system that includes a hybrid of software and hardware components.

BACKGROUND

In a packet switched network, the transmission control protocol (TCP) is the most widely used to ensure the correct delivery of data. However, at some intermediate nodes within a network, the overall ingress speed might be larger than egress due to having too many concurrent data flows passed through them. The corresponding packet buffers there will eventually fill up. As the amount of data remaining in the buffers keeps rising, the packet delay increases as a result. It is even worse when packets are dropped due to buffers being full. Congestion control (CC) algorithms have been developed to avoid this situation. These algorithms are intended to react quickly to congestion signals by restraining flows from imposing more pressure on the network. They also need to make sure that the network resources are shared fairly between flows. CC algorithms are designed and integrated deeply into the TCP stack of the standard operating systems' kernel (Linux, Windows, etc.) with strict controls over the functionalities and behaviors. This helps safeguard the network from collapsing as a majority of the network-connected machines have these standard operating systems installed.

Almost all of the CC algorithms are software based. As networking capabilities increase, there is a need for having another form of CC algorithm to keep up with the increase. Even though the CPUs' computation powers have also been increasing, there are more applications and services that the CPUs have to handle. It is especially a problem at the data center scale where computation is the main profit-making resource. For example, with 100G Ethernet interfaces, the pure-software networking stacks tend to consume 10-40% of CPU cycles to meet the demands of the high bandwidth applications. This is not to mention the cases where complex software implemented CC algorithms are used or where latency could be compromised.

Hardware solutions also have limitations since existing hardware solutions for networking stacks and CC are limited to fixed-function implementations. Hardware implemented CC algorithms cannot be changed or updated unless new hardware is released. Further, hardware-based protocols do not support different CC algorithms for different virtual machines (VM) or containers in a virtualized environment. Thus, while hardware implemented CC algorithms save CPU time, they suffer from inflexibility and are generally non-programmable.

SUMMARY

One example described herein is a computing system that includes a processor, memory storing a congestion control (CC) runtime, and a network interface card (NIC). The NIC includes a CC data processing unit configured to perform tasks corresponding to a plurality of CC algorithms where the CC runtime is configured to program the CC data processing unit to perform tasks corresponding to a selected one of the plurality of CC algorithms, a measurement module configured to monitor ingress and egress packets to capture performance measurements corresponding to the plurality of CC algorithms where the CC runtime is configured to program the measurement module to capture a subset of the performance measurements corresponding to the selected CC algorithm, and an enforcement module configured to control a manner egress packets are transmitted from the computing system.

One example described herein is a method that includes receiving an instruction to register a new CC algorithm in a computing system, selecting first measurements to be captured for the new CC algorithm by a measurement module when monitoring ingress and egress packets where the measurement module is configured to capture a plurality of measurements and the first measurements are a subset of the plurality of measurements, configuring a CC data processing unit to process the first measurements according to the new CC algorithm where the CC data processing unit is capable of being programmed to perform tasks corresponding to a plurality of different CC algorithms, and enabling an enforcement module to control egress packets leaving the computing system according to the new CC algorithm where the measurement module, the CC data processing unit, and the enforcement module are implemented in hardware.

One example described herein is an integrated circuit that includes a CC data processing unit comprising hardware designed to perform tasks corresponding to a plurality of CC algorithms, where, in response to first instructions from a CC software application, the CC data processing unit is programed to perform tasks corresponding to a selected one of the plurality of CC algorithms. The integrated circuit also includes a measurement module configured to monitor ingress and egress packets to capture performance measurements corresponding to the plurality of CC algorithms, where, in response to second instructions from the CC software application, the measurement module is configured to capture a subset of the performance measurements corresponding to the selected CC algorithm, and an enforcement module configured to control a manner egress packets are transmitted from a computing system.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIGS. 5A-5C illustrate different workflows of a congestion control engine with software and hardware components, according to examples.

FIGS. 6A and 6B illustrate a table of performance measurement parameters, according to an example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
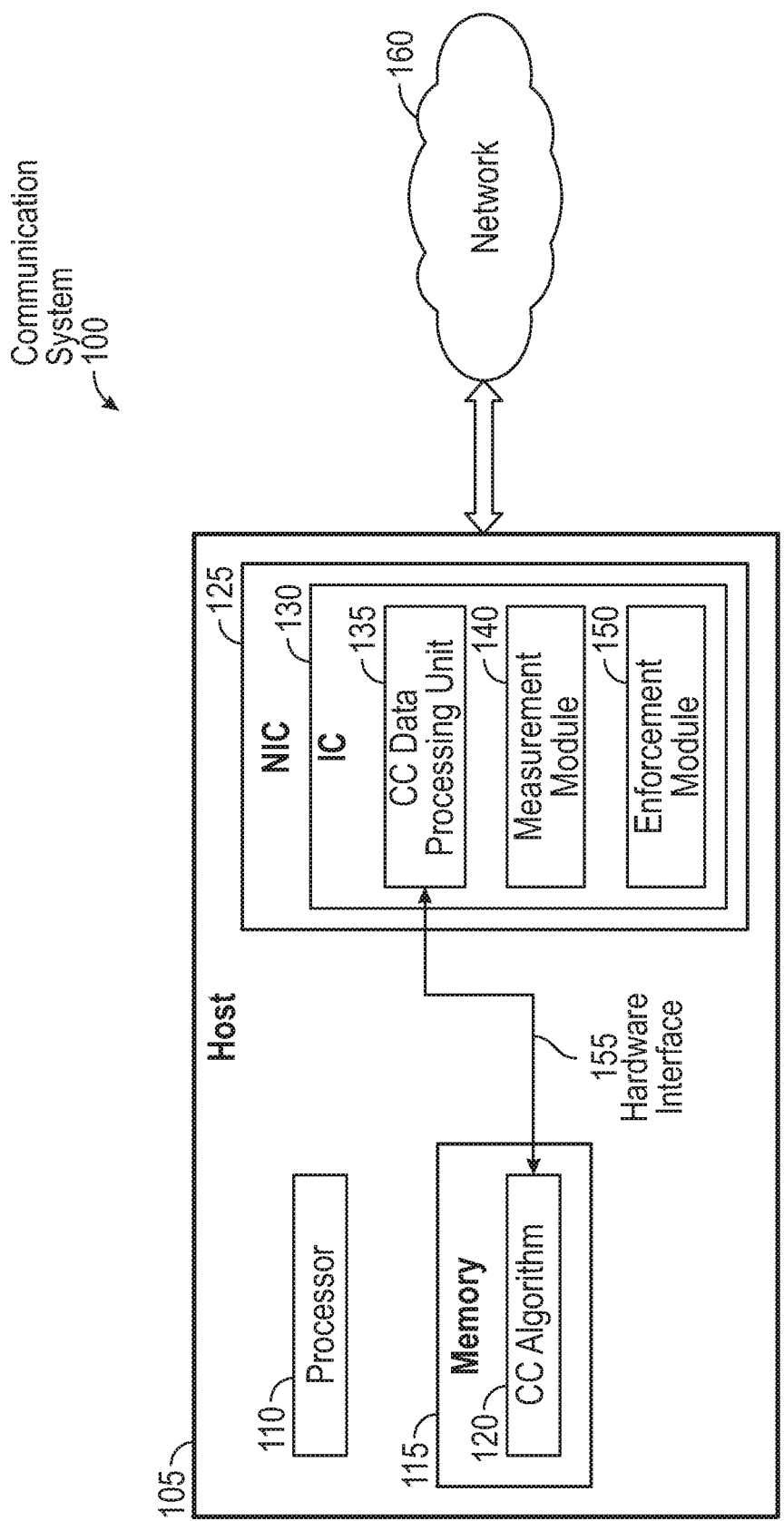
FIG. 1 is a block diagram of a communication system with a congestion control engine with software and hardware components, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

The description herein proposes a programmable network-attached acceleration system framework for congestion control (CC), which sits between the processing units (CPUs) and the network interfaces. This framework can be integrated into devices such as a network interface card (NIC), SmartNIC, or stand-alone system on a chip (SoC). The framework is designed to be programmable and can be adapted at runtime to various requirements from a user in measurements it captures, enforcement, and hardware-software interactions. The flexibility of the framework combined with its offloading acceleration mechanisms is beneficial in freeing the CPUs from doing such tasks, effectively improving the overall performance of the system. Beyond the specific function of congestion control, the acceleration framework can be utilized not only to accelerate existing software stacks for other networking functions, but also to enable programmable hardware stacks.

In one embodiment, the acceleration framework includes a hybrid CC engine where some components are implemented in software (e.g., a CC algorithm) while other components are implemented in hardware (e.g., measurement and enforcement modules and a flexible processing unit). The hardware components can be designed to provide measurements that can be used by multiple different types of CC algorithms (known or future CC algorithms). Depending on which CC algorithms are currently enabled, the hardware components can be programmed to perform measurement, processing, and enforcement tasks, thereby freeing the CPUs in the host to perform other tasks. In this manner, the hybrid CC engine can have the flexibility of a pure software CC algorithm with the advantage of performing many of the operations associated with the CC algorithm in hardware.

FIG. 1 is a block diagram of a communication system 100 with a congestion control engine with software and hardware components, according to an example. The communication system 100 includes a host 105 (e.g., a computing system such as a standalone server, blade server, laptop, etc.) connected to a network 160 (e.g., the Internet or a local area network (LAN)). The host 105 includes a processor 110, memory 115, and a NIC 125. The processor 110 represents any number of processing elements (e.g., CPUs) with any number of processing cores. The memory 115 (also referred to as host memory) can include volatile and non-volatile memory elements. In this example, the memory 115 stores a CC algorithm 120 which can be any known or future congestion control technique—e.g., TCP congestion control such as Reno, FAST, BBR, etc. In this example, the CC algorithm 120 is software that is executed by the processor 110 (e.g., a CPU).

The NIC 125 includes an integrated circuit (IC) 130 that can be an application-specific integrated circuit (ASIC), field-programmable gate array (FPGA), or system on a chip (SoC) that includes hardened circuitry, programmable logic, or combinations thereof. Further, while the IC 130 is shown as being in the NIC 125, in other embodiments, the IC may be external to the NIC 125 and may serve as an interface between the processor 110/memory 115 and the NIC 125.

The IC 130 includes a CC data processing unit 135, a measurement module 140, and an enforcement module 150. The CC algorithm 120 is able to program or configure the CC data processing unit 135 to perform one or more tasks corresponding to the CC algorithm 120. As discussed in more detail below, the CC data processing unit 135, measurement module 140, and the enforcement module 150 include circuitry (either hardened circuitry or programmable logic) to perform tasks indicated in the CC algorithm. Further, a user can change or load different CC algorithms 120 into the memory 115 which can in turn configure the hardware components in the IC 130 to perform different tasks using a hardware interface 155 (e.g., a PCIe interface).

In FIG. 1, the CC data processing unit 135, measurement module 140, and enforcement module 150 form an acceleration system framework for accelerating tasks assigned by the CC algorithm in hardware. Further, the CC algorithm 120 in combination with the CC data processing unit 135, measurement module 140, and enforcement module 150 form a hybrid CC congestion engine with hardware and software components.

Figure 2:
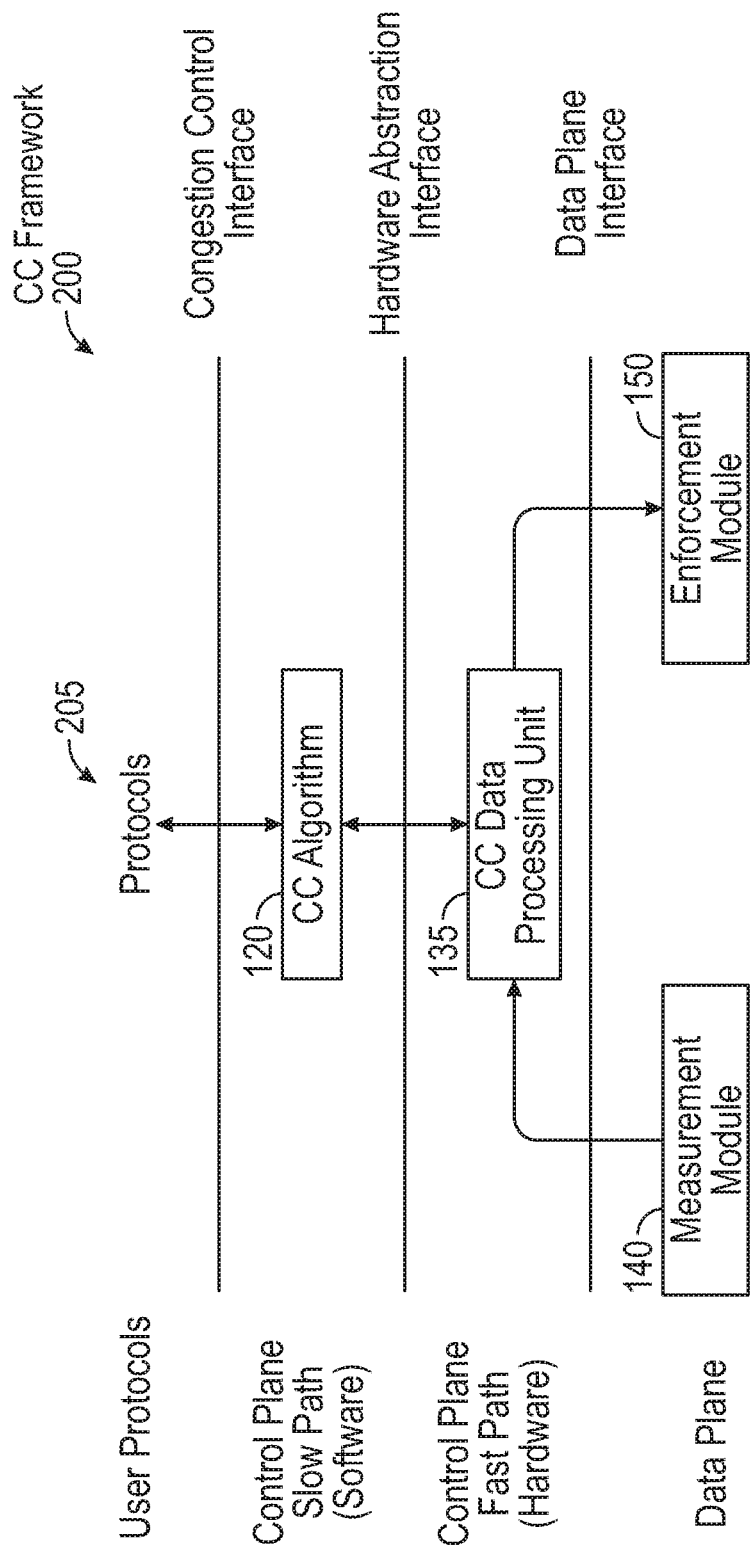
FIG. 2 illustrates a congestion control framework, according to an example.

FIG. 2 illustrates a congestion control framework 200, according to an example. The framework 200 includes, at an upper level, a user protocol 205 such as the Ethernet protocol, TCP, or user datagram protocol (UDP). The user protocol 205 manages the state of the connections, data buffering, etc. for the higher application layer that includes the CC algorithm 120. As shown, the CC algorithm 120 is part of a control plane slow path which is implemented using software executed by the processors in the host.

The framework 200 also includes the CC data processing unit 135 which is disposed in a control plane fast path layer and is implemented using hardware. Further, the framework 200 includes a data plane that contains the measurement module 140 and the enforcement module 150. The measurement module 140 monitors ingress and egress network traffic (that is transmitted according to the protocol 205) and provides performance metrics to the CC data processing unit 135 in the control plane. After processing the metrics, in some embodiments, the CC data processing unit 135 sends control parameters to the enforcement module 150 for controlling how egress network traffic is transmitted from the host.

The data plane is where packets are transferred either in or out of the host. In one embodiment, the measurement module 140 monitors all packets to collect relevant statistics. The enforcement module 150 controls and schedules when, and how many, packets should leave the host to the remote location (e.g., the network). In one example, the modules 140, 150 within the data plane process the packets at line rate.

The control plane is composed of two sub-components (i.e., the CC data processing unit 135 and the CC algorithm 120) which are positioned in the hardware (fast path) and software (slow path). These sub-components work in tandem to manage the CC congestion engine. In some embodiments, the CC data processing unit 135 and the CC algorithm 120 can operate independently with minimal interactions to further reduce the communication overhead and latency. These sub-components make decisions to change the behavior of the enforcement module 150 based on the performance data measured by the measurement module 140. In one embodiment, CC data processing unit 135 updates the generic flow statistics calculations and thresholding based on configurations provided by the user and the data sent by the measurement module 140. Conversely, the CC algorithm 120 may execute the full algorithm. The user interacts with the slow path (i.e., the CC algorithm 120) using the congestion control interface to supervise and configured the fast path using the hardware abstraction interface (e.g., PCIe interface).

The control plane (both fast and slow paths) is a flexible abstracted system that includes hardware architecture and workflows to support User-specific congestion control protocols—e.g., the CC algorithm 120. This framework 200 offers at least two advantages: (1) a wide range of congestion control algorithms and systems can be accelerated or better controlled with a higher accuracy and latency by the hardware and (2) the programmability of the framework 200 allows implementing customized transport protocols or other protocols in the future. It can also work with the hardware implemented protocols to add another layer of programmability.

Figure 3:
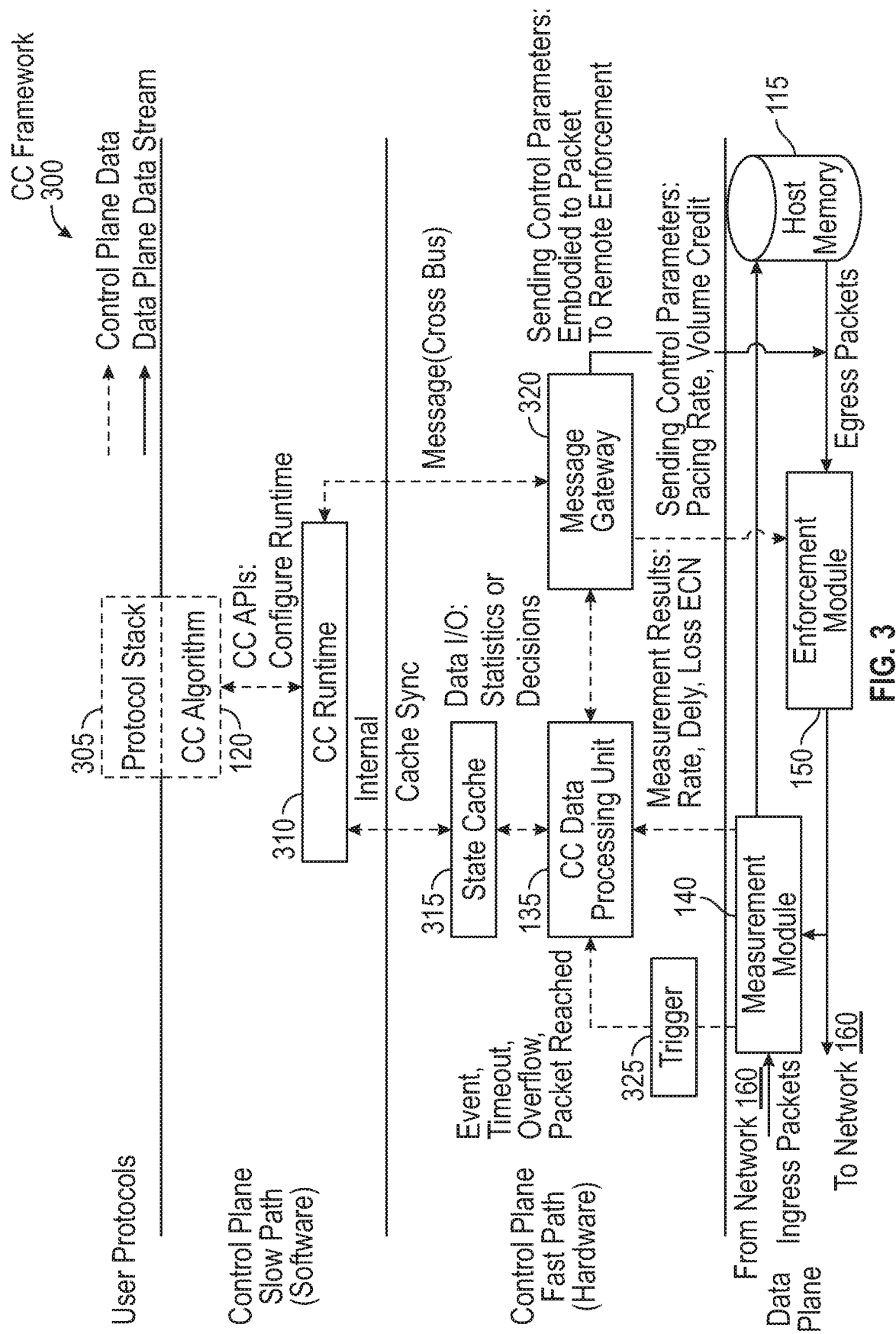
FIG. 3 illustrates a congestion control framework, according to an example.

FIG. 3 illustrates a CC framework 300, according to an example. The framework 300 (or architecture) is an example of a more in-depth view of the framework 200 in FIG. 2. In this example, the user protocol layer (i.e., the top layer) includes a protocol/stack 305 that interfaces with the CC algorithm 120 in the control plane (slow path). This layer also includes a CC runtime 310 which is a bridge between the control plane fast path and the slow path. In one embodiment, the CC runtime 310 resides in the kernel space of the operating system of the host as either built-in or loadable. The CC runtime 310 processes the runtime messages and provides application programmable interfaces (APIs) for the CC algorithm(s) 120. The APIs are exposed for both kernel-space and user-space CC algorithms 120. The user-space CC algorithms 120 are easier to deploy and quicker to implement than the kernel-space counterparts. Therefore, supporting the user-space APIs adds more flexibility to the framework 300. These (kernel and user-space) APIs allow the CC algorithms 120 to obtain measurement results or status from the hardware, process the data, and calculate the control parameters. Afterwards, the CC runtime 310 sends the control parameters as a message back to the data plane. The CC runtime 310 can also manage state cache 315 and message communication to/from a message gateway 320.

The state cache 315, which is located in the control plane (fast path) in the hardware, stores and maintains the local states of data flows which are used by the CC data processing unit 135. Since hardware memory is limited, it may not be possible to store all the flow states required by hundreds of thousands of flows locally in the cache 315. The state cache 315 instead caches the most frequently used flow states in the fast path (hardware) while the less frequently referenced flow states are kept in the slow path (software). The key used to perform a lookup into the state cache 315 is a flow ID.

When the CC data processing unit 135 wants the local states of a certain flow which are not in the state cache 315, the CC data processing unit 135 will not proceed further. In one scenario, the raw measurement results are sent to the control plane slow path where the slow path will perform the algorithm, generate the control parameters and update the state cache 315. Alternatively, the slow path updates the state cache 315 first and lets the fast path calculate the final control parameters. These different operation flows are discussed in more detail in FIGS. 5A-5C below.

The message gateway 320 acts as a message distributor/gatherer for the related modules with their own interfaces. The reason is that each module in the CC framework 300 might have its own interface, communication protocol, or clock domain. Even when these attributes are similar, having direct communication channels between modules is not only complicated but also expensive in terms of resources consumption and critical path delay. The message gateway 320 enables communication between these components rather than relying on direct communication channels.

A typical message contains a message type, a flow-ID, and message data. The other modules in the framework 300 subscribe to the message types that they are interested in. It is worth noting that the modules do not necessarily have to subscribe to the messages by themselves. In one embodiment, the control plane slow path is responsible for determining which messages a module is subscribed to. Nevertheless, it is possible for the modules to act independently by sending a subscribe/unsubscribe message to the message gateway's configuration slave bus interface. The message gateway 320 forwards the corresponding messages to the modules as soon as the messages arrive. This could be done via a common addressable bus or direct connections.

In one embodiment, the messages exchanged between the software and the hardware components (e.g., between the control plane slow and fast paths) are transmitted via the PCIe bus. To simplify the communication protocol and to avoid having another layer of device driver beside the NIC to share the PCIe functions, the messages can be relayed to the normal Ethernet packet channels. In one embodiment, the messages which are sent by the message gateway 320 have a special header that can be recognized by the NIC driver. These messages are forwarded to the CC runtime 310 instead of the network stack, which could be either the implementation inside the kernel or the kernel-bypassed user-space counterpart. Similarly, the message gateway 320 parses the packets sent from the CC runtime 310 to filter out the messages. Alternatively, other communication services provided on the PCIe bus such as register access and generic memory mapped can also be used for these purposes.

In one embodiment, the message gateway 320 packs multiple messages into a data block before sending to the PCIe host to minimize the PCIe transmission overhead. Conversely, the message gateway 320 unpacks data blocks sent by the host into separate messages before forwarding them to the other modules. Likewise, in the software side, the host extracts the data block sent from the hardware and forwards the messages to the interested functions using the callback mechanism registered by those functions. In one embodiment, the host also packs messages dedicated to the hardware modules together before sending them.

The CC data processing unit 135 performs data processing algorithms. In some embodiments, the processing unit 135 offloads some of the software protocol's procedures so it can accelerate the software processes to generate the control parameters by itself, to send pre-processed results to software, or to support other hardware protocol implementations. In one embodiment, the CC data processing unit 135 module supports arithmetic, comparison, and data assignment functions.

After being activated by a trigger 325, the CC data processing unit 135 reads the measurement results from the data plane. After that, the CC data processing unit 135 executes a pre-configured decision-making algorithm to process the results through a series of steps: determining the state, carrying out calculations, updating local state and communicating messages with the other modules. Besides the CC-related decision-making algorithms, algorithms used to calculate advanced measurement metrics such as exponentially weighted moving average (EWMA), smoothed RTT (SRTT), RTT variation (RTTVar), etc., could be supported by the processing unit 135 depending on the hardware configuration.

The CC data processing unit 135 could be implemented in hardware in multiple ways to support different CC algorithms. In one embodiment, the CC data processing unit 135 is an ALU-like or Systolic-array-like data engine where the instructions are given by the control plane slow path depending on the CC algorithm being implemented. In one embodiment, the CC data processing unit 135 includes an instruction memory block that stores the instructions needed for the CC algorithms. In another embodiment, the CC data processing unit 135 is implemented using dedicated hardware. Since the framework 300 can be implemented using FPGA, different CC algorithms could be implemented directly by the FPGA logic. In that scenario, the CC data processing unit 135 can be composed of multiple sub-units, each representing a different CC algorithm. When a new CC algorithm is desired, it could be either added to the CC data processing unit 135 at design time, or at runtime by replacing any free sub-unit using, e.g., a partial-reconfiguration technique.

If cache synchronization is needed by the state cache 315, the CC data processing unit 135 might wait for the synchronization to finish before proceeding. Raw measurement results sent by the measurement module 140 will be pushed into a FIFO for later processing. Another possible implementation is to support out-of-order execution where the flows that need synchronization are kept in a dedicated queue to wait for the updated data. The CC data processing unit 135 assigns to this queue a higher priority.

The trigger 325 keeps track of the status of the flows and generates the corresponding events to the CC data processing unit 135. The per-flow events can be triggered by a timer or by matching packet headers. Both the monitoring and triggering mechanisms can be configured as programmable hardware. When the trigger 325 finds a match between a packet and a flow of interest, it obtains the flow ID and forwards it to other modules in the framework 300 such as the CC data processing unit 135.

Figure 4:
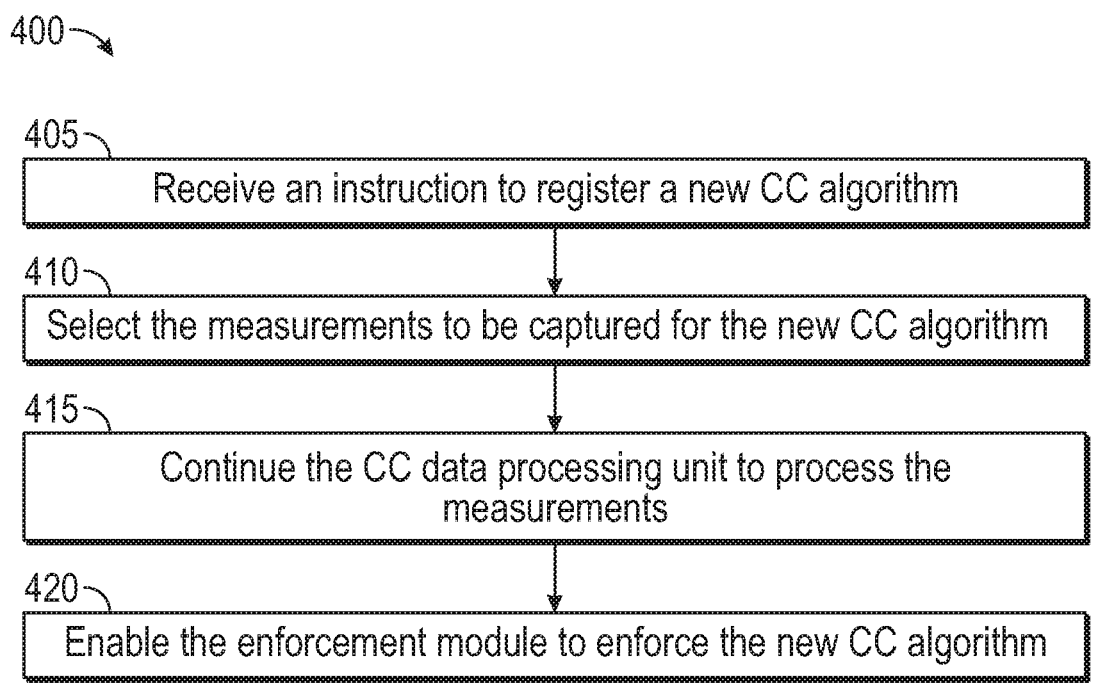
FIG. 4 is a flowchart of programming a congestion control engine with software and hardware components, according to an example.

FIG. 4 is a flowchart of a method 400 of programming a congestion control engine with software and hardware components, according to an example. As mentioned above, the hardware in the CC framework (e.g., the CC data processing unit 135, the message gateway 320, the measurement module 140, and the enforcement module 150) is able to execute different CC algorithms in parallel (i.e., at the same time). Further, the hardware is programmable or configurable so that it can be reprogrammed as described in the method 400 to add, remove, or switch between executing different CC algorithms.

At block 405, the CC runtime in the control plane slow path (i.e., the software) receives an instruction from a user, or user application, to register a new CC algorithm to control how data is transmitted out of the host. This includes associating a communication flow with a desired CC algorithm and measurement metrics supported by the proposed hardware.

At block 410, the measurement module 140 is used to capture parameters listed in FIGS. 6A-6B. Different CC algorithms can enable the measurement module 140 to measure specific parameters via configuration. The proposed framework supports multiple communication flows, and each flow can be associated with a different CC algorithm and a set of measurements. In block 405, when a new flow is created and a CC algorithm is selected, a unique ID is assigned to that flow and the measurement hardware is configured accordingly. A flow can be identified based on the information such as source/destination IP addresses, source/destination ports, etc. When a packet (either ingress or egress) passes through the measurement module 140, the aforementioned information is parsed from the packet. Afterwards, the associated flow ID is retrieved from the internal memory. Based on the flow ID, the measurement module 140 knows which CC algorithm is used for that flow and which measurement metrics to calculate.

At non-exhaustive list of different types of measurements that can be captured by the measurement module 140 is provided in FIGS. 6A and 6B which is a table 600 of performance parameters. For example, the measurement module may be able to measure all of the performance parameters listed in table 600, but depending on which CC algorithm the framework is configured to perform for a particular flow, the measurement module may calculate a subset of the listed performance parameters. These selected performance results are then forwarded to the CC data processing unit.

In one embodiment, the CC runtime 310 instructs the measurement module 140 which performance measurements it should capture in order to execute the new CC algorithm. For example, the CC runtime 310 can use the message gateway to forward configuration instructions to the measurement module 140.

At block 415, the CC runtime 310 configures the CC data processing unit to process the measurements according to the new CC algorithm. As discussed above in FIG. 3, the hardware/circuitry of the CC data processing unit may be able to perform many different CC algorithms because it is implemented using an ALU-like or Systolic-array-like data engine, or it includes hardware dedicated to perform each different CC algorithm. Thus, the CC runtime 310 can configure the CC data processing unit to perform the new CC algorithm.

In some embodiments, the CC data processing unit performs the tasks or functions of a new CC algorithm without the help of software (e.g., the control plane slow path). That is, the CC data processing unit can receive the performance measurement results from the measurement module 140, process the results, and provide instructions to the enforcement module 150, without relying on input from the CC runtime or CC algorithm executing in software. However, in other embodiment, some or most of the tasks of the new CC algorithm may be performed in the software. That is, the CC data processing unit may forward the performance measurement results (or a selected subset of the performance measurement results) received from the measurement module 140 to the software elements where the measurements are processed. The software can then send control parameters to the enforcement module. In this example, the CC algorithm is executed in both the hardware in the CC framework as well as the host CPU. Additional details of different workflows for executing the CC framework is provided in FIGS. 5A-5C below.

At block 420, the CC runtime enables the enforcement module to regulate flows based on the control parameters calculated by the CC algorithm. That is, the CC runtime configures the hardware (e.g., the CC data processing unit), and in some embodiments the software, to provide control parameters to the enforcement module that tell this module how to process egress packets. For example, these received control parameters can tell the enforcement module when, and how many, packets should be transmitted from the host to the network (or other remote location). In one embodiment, the enforcement modules schedule regulates the packets based on the requested pacing value (sending speed) and/or volume credit (sending size, i.e., how many packets should be sent before receiving acknowledgement (ACK) signals).

In one embodiment, a pacing engine in the enforcement module is designed with algorithms such as leaky bucket or token bucket. Each flow of interest is assigned to a bucket with configurable size and timing, and the corresponding egress packets are paced accordingly.

In one embodiment, a volume credit engine in the enforcement module is designed with a feedback from the measurement module to count the number of packets currently in flight. Whenever an ACK is received by the measurement module, the corresponding number of packets inflight are sent to the enforcement module. If it is below the requested credit, and the packets are ready, they will be sent out respectively to maintain that credit. The enforcement module keeps track of the numbers of packets inflight internally along with the other necessary information of the flows.

In one embodiment, when the enforcement module's internal buffers are full, packets sent from the host are dropped. To compensate, the higher-level communication protocol can have mechanisms to retransmit the lost packets. In the early stage of the flow or when the major events occur (e.g., many flows are created within a short amount of time), and the CC algorithms may not yet settled to a bandwidth equilibrium, and as a result, there could be many packets dropped. The packet retransmission does not affect the network as the packets have not left the NIC or host yet.

Figure 5C:
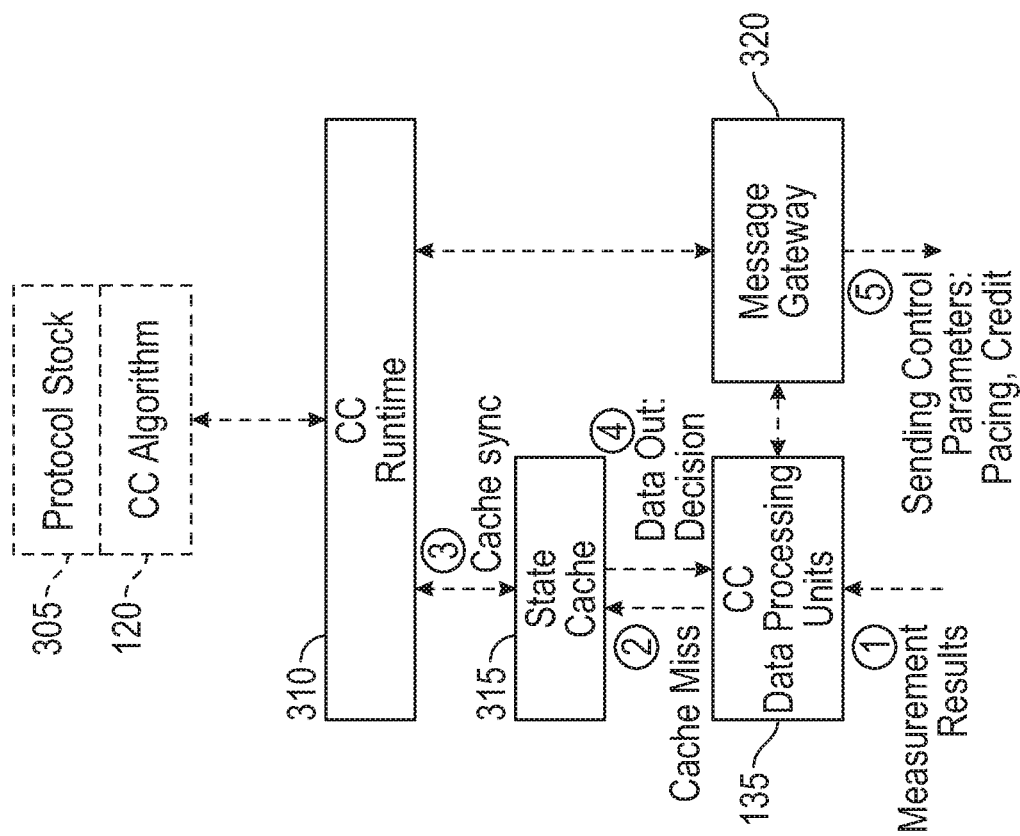

FIGS. 5A-5C illustrate different workflows of a congestion control engine with software and hardware components, according to examples. FIG. 5A illustrates the embodiment where the control plane slow path (i.e., software) provides control parameters to the enforcement module while the fast path accelerates the slow path by performing, for example, initial statistical calculations on the measurement results received from the measurement module. That is, in FIG. 5A, the software performs many of tasks of a CC algorithm while the CC data processing unit executes ancillary tasks that helps to alleviate the burden on the host CPU. FIG. 5A may be used to execute a CC algorithm if, for example, the algorithm relies on complicated calculations that cannot be performed in the CC data processing unit 135, or relies on data that may not be available to the CC data processing unit 135. Further, FIGS. 5A-5C assume that method 400 has already been performed so that the hardware is configured to perform the selected CC algorithm.

In FIG. 5A, there are seven major steps involved. At step 1, the CC data processing unit 135 receives the measurements from the measurement module (not shown). At step 2, the CC data processing unit 135 fetches the internal flow states by querying the state cache 315 and processes the measurement results to obtain the flow statistics required by the slow path (i.e., the CC runtime 310). At step 3, the CC data processing unit 135 provides the data to the message gateway 320. This data can include both raw measurements provided by the measurement module and the processed measurement results (e.g., statistics) generated by the CC data processing unit 135.

At step 4, the message gateway 320 forwards the data to the CC runtime 310, where in steps 5 and 6, the slow path (which includes the CC runtime 310, the CC algorithm 120, and the stack 305) calculates instructions (e.g., control parameters such as pacing rate or credits) for the enforcement module. At step 7, the message gateway 320 forwards the control parameters to the enforcement module (not shown) which then controls how the egress packets leave the host in response.

While FIG. 5A illustrates a cache hit at step 2 where the state cache 315 contains the state of the flow currently being evaluated, if there was instead a miss in the state cache 315, the CC data processing unit 135 forwards only the raw measurement data received from the measurement module to the slow path without any additional processing being done by the CC data processing unit 135. In that case, the slow path may carry out the full algorithm by itself.

FIG. 5B depicts the case where the local flow is present in the cache and the control parameters are entirely computed by the fast path. The slow path only participates when a flow enters and exits. FIG. 5B may be the operation workflow when the CC data processing unit is able to perform all the tasks of the CC algorithm without assistance from the software.

Steps 1 and 2 are the same as in FIG. 5A where the CC data processing unit 135 receives measurements for a particular flow, and receives state data corresponding to that flow from the state cache 315 (i.e., there is a cache hit). At step 3, the CC data processing unit 135 executes the tasks of the CC algorithm to obtain the control parameters. That is, the CC data processing unit 135 can generate the control parameters for the enforcement module without aid from the software. The CC data processing unit 135 then sends these control parameters to the message gateway 320 which, at step 4, forwards the control parameters to the enforcement module. Thus, in FIG. 5B, the hardware does not communicate with the software when executing the CC algorithm, but this assumes there is a cache hit.

FIG. 5C illustrates the same scenario as FIG. 5B where the CC data processing unit can execute the tasks of the CC algorithm without help from the software, but there is a cache miss in the state cache 315 rather than a hit.

After receiving the measurements and determining there is a cache miss during steps 1 and 2, at step 3, the fast path (i.e., the hardware) temporarily holds the trigger event and requests a cache synchronization which relies on the control plane slow path (i.e., software). After the cache is updated to include the state data for the flow currently being processed, the state cache 315 triggers the CC data processing unit 135 to resume the algorithms and the rest of the workflow proceeds the same as in FIG. 5B.

Pausing the hardware in order to perform cache synchronization might appear to be a bottleneck; however, it likely will not have a negative impact to the expected performance of the flow. While the synchronization is happening, the higher-level protocol 305 (in the software) still needs to process the acknowledge packets and prepare the next data packets. The fast path will likely be able to finish processing before the next data packets are sent out by the software.

When a flow in any of the scenarios shown in FIGS. 5A-5C does not wish to use the hardware-based CC algorithm anymore, or is completed (the application closes the connection), the protocol 305 can remove the flow from the hardware via provided APIs. The CC runtime 310 removes the related packet header parser entry and recycles the memory allocated for the flow in the state cache 315. When a flow or CC algorithm (either in the kernel or user space) is removed from the host, the corresponding connections inside the hardware such as the message subscription in the message gateway 320, the tasks of the algorithm performed by the CC data processing unit 135, and measurement tasks performed by the measurement module are also deactivated.

To provide an example of a specific algorithm, the embodiments above, can perform the BBR congestion control algorithm for wide area networks. The BBR state machine includes four main states: startup, drain, probe_bw and probe_rtt. After the first two states, the CC framework remains in the third state if there is enough data to send. Only after actively sending and increasing the sending rate for ten seconds, the framework goes to the fourth state to refresh the minimum RTT estimation. It also minimizes the packets in flight during this period.

At any state, the CC framework can read the RTT, sending speed, receiving speed value as well as Bandwidth-Delay-Product (BDP) calculation results generated by the hardware accelerator (i.e., the CC data processing unit 135). During the probe_bw state, the CC framework tries to drain the queue. If the RTT sample is not increasing, the CC framework increases the pacing value.

In another example, the embodiments above, can perform Timely which is a congestion control algorithm originally designed for but not restricted to RDMA in a data center. Timely uses RTT as a congestion signal, and AIMD (Additive Increase and Multiplicative Decrease) as a control process. The Timely Engine includes three parts: RTT measurement engine, rate calculation engine and pacing engine. The states in Timely are AI (Additive Increase), MD (Multiplicative Decrease), and GID (Gradient-based Increase/Decrease). The CC data processing unit can support the comparison and rate calculation required by the Timely Engine when in these states.

In one embodiment, the CC framework discussed above can be integrated into the kernel stack. The kernel stack accesses the hardware not only to control its behavior but also to read the performance measurements and the CC data processing unit's results. The kernel stack can use these results to update its internal flow statistics without directly calculating them. As a result, the host CPU is free to process other tasks. Additionally, any CC algorithm that is making use of the kernel provided mechanisms to control the flows inherently benefits from the hardware portions of the CC framework. For the users' other custom protocols and CC algorithms which need to bypass the kernel stack, it is still possible to do so with the CC framework.

In another example, the embodiments herein can benefit the QUIC congestion control algorithm, which operates within the user space. This CC algorithm could obtain the measurement results via the user-space interface exposed by the control plane slow path. Likewise, the QUIC algorithm can sends the control parameters to the enforcement module via that interface. However, a hardware TLS encryption and decryption modules may be used to identify multiple streams multiplexed within a QUIC flow. If these modules are needed, they could be implemented inside the trigger module.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A network interface card (NIC), comprising:
congestion control (CC) data processing circuitry configured to perform tasks corresponding to a plurality of CC algorithms,
wherein a CC runtime is configured to program the CC data processing circuitry to perform tasks corresponding to a selected one of the plurality of CC algorithms;
measurement circuitry configured to monitor ingress and egress packets to capture performance measurements corresponding to the plurality of CC algorithms,
wherein the CC runtime is configured to program the measurement circuitry to capture a subset of the performance measurements corresponding to the selected CC algorithm; and
enforcement circuitry configured to control a manner in which egress packets are transmitted from a computing system,
wherein: the CC data processing circuitry is further configured to
perform the tasks corresponding to the selected CC algorithm to process the subset of the performance measurements and
generate processed data and forward the processed data to the CC runtime,
the CC runtime is configured to generate control parameters for the enforcement circuitry based on the processed data, and
the control parameters control the manner the egress packets are transmitted.

2. The NIC of claim 1,
wherein the measurement circuitry is configured to, during operation, transmit the subset of the performance measurements to the CC data processing circuitry.

3. The NIC of claim 2,
wherein the CC data processing circuitry is configured to generate control parameters for the enforcement circuitry based on the processed data,
wherein the control parameters control the manner the egress packets are transmitted.

4. The NIC of claim 2, further comprising:
a state cache,
wherein the CC data processing circuitry is configured to query the state cache to identify a flow state using a flow ID,
wherein the flow state is used, along with the subset of the performance measurements, to generate the processed data.

5. The NIC of claim 1,
wherein the CC data processing circuitry, the measurement circuitry, and the enforcement circuitry are implemented in one or more integrated circuits in the NIC.

6. The NIC of claim 5,
wherein the CC data processing circuitry, the measurement circuitry, and the enforcement circuitry are implemented in a same integrated circuit in the NIC.

7. A method, comprising:
receiving an instruction to register a new congestion control (CC) algorithm in a computing system;
selecting first measurements to be captured for the new CC algorithm by measurement circuitry when monitoring ingress and egress packets,
wherein the measurement circuitry is configured to capture a plurality of measurements, the first measurements are a subset of the plurality of measurements;
configuring CC data processing circuitry to process the first measurements according to the new CC algorithm, wherein the CC data processing circuitry is capable of being programmed to perform tasks corresponding to a plurality of different CC algorithms;

enabling enforcement circuitry to control egress packets leaving the computing system according to the new CC algorithm;

performing tasks corresponding to the new CC algorithm in the CC data processing circuitry to process the first measurements and generate processed data;

forwarding the processed data to a CC software application; and generating, using the CC software application, control parameters for the enforcement circuitry based on the processed data, wherein the control parameters control a manner the egress packets are transmitted by the enforcement circuitry.

8. The method of claim 7, wherein the measurement circuitry, the CC data processing circuitry, and the enforcement circuitry are implemented in a same integrated circuit.

9. The method of claim 8, wherein the same integrated circuit is part of a NIC.

10. The method of claim 7, further comprising:

transmitting the first measurements to the CC data processing circuitry.

11. The method of claim 10, further comprising:

generating, in the CC data processing circuitry, control parameters for the enforcement circuitry based on the processed data, wherein the control parameters control the manner the egress packets are transmitted by the enforcement circuitry.

12. The method of claim 10, further comprising:

querying a state cache to identify a flow state using a flow ID, wherein the flow state is used, along with the first measurements, to generate the processed data in the CC data processing circuitry.

13. An integrated circuit, comprising:

congestion control (CC) data processing circuitry designed to perform tasks corresponding to a plurality of CC algorithms using sub-units, each of the sub-units corresponding to a different CC algorithm, wherein:

in response to first instructions from a CC software application, the CC data processing circuitry is configured to select one of the plurality of CC algorithms, and activate a first one of the sub-units corresponding to the selected CC algorithm;

the CC data processing circuitry is programed to perform tasks corresponding to the selected CC algorithm using the first sub-unit, wherein a second one of the sub-units corresponding to a unselected one of the plurality of CC algorithms remains deactivated when performing the tasks corresponding to the selected CC algorithm; and in response to determining that the selected CC algorithm is no longer needed, the CC data processing circuitry is configured to deactivate the first sub-unit corresponding to the selected CC algorithm in hardware via provided application programmable interfaces (APIs);

measurement circuitry configured to monitor ingress and egress packets to capture performance measurements corresponding to the plurality of CC algorithms, wherein, in response to second instructions from the CC software application, the measurement circuitry is configured to capture a subset of the performance measurements corresponding to the selected CC algorithm; and enforcement circuitry configured to control a manner egress packets are transmitted from a computing system.

14. The integrated circuit of claim 13, wherein the measurement circuitry is configured to, during operation, transmit the subset of the performance measurements to the CC data processing circuitry, wherein the CC data processing circuitry is configured to perform the tasks corresponding to the selected CC algorithm to process the subset of the performance measurements and generate processed data.

15. The integrated circuit of claim 14, wherein the CC data processing circuitry is configured to generate control parameters for the enforcement circuitry based on the processed data, wherein the control parameters control the manner the egress packets are transmitted.

16. The integrated circuit of claim 13, wherein the CC data processing circuitry forwards processed data to the CC software application, and wherein the enforcement circuitry is configured to receive control parameters for the enforcement circuitry from the CC software application, wherein the control parameters control the manner the egress packets are transmitted.

17. The integrated circuit of claim 13, wherein the CC data processing circuitry comprises an ALU or Systolic array that are programmable in order to perform the tasks corresponding to the plurality of CC algorithms.

18. The integrated circuit of claim 13, wherein the CC data processing circuitry is configured to retrieve a flow state from a state cache using a flow ID, wherein the flow state is associated with the selected CC algorithm and the subset of performance measurements, and the flow ID is identified when the ingress and egress packets pass through the measurement circuitry.

* * * * *